US012744853B2

(12) United States Patent
Inoue

(10) Patent No.: US 12,744,853 B2
(45) Date of Patent: Sep. 22, 2026

(54) IMAGE PROCESSING APPARATUS, IMAGE PROCESSING METHOD, AND RECORDING MEDIUM FOR ADDING INVISIBLE ERROR INFORMATION AND CONTROLLING IMAGE DATA OUTPUT

(71) Applicant: Mika Inoue, Kanagawa (JP)

(72) Inventor: Mika Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 234 days.

(21) Appl. No.: 18/668,648

(22) Filed: May 20, 2024

(65) Prior Publication Data

US 2024/0397004 A1 Nov. 28, 2024

(30) Foreign Application Priority Data

May 26, 2023 (JP) ................................ 2023-087154

(51) Int. Cl.
*H04N 1/00* (2006.01)
*G06F 3/12* (2006.01)
*G06V 30/12* (2022.01)
*H04N 1/32* (2006.01)

(52) U.S. Cl.
CPC ......... *H04N 1/0044* (2013.01); *G06F 3/1208* (2013.01); *G06F 3/1256* (2013.01); *G06V 30/127* (2022.01); *H04N 1/32267* (2013.01)

(58) Field of Classification Search
None
See application file for complete search history.

(56) References Cited

U.S. PATENT DOCUMENTS

2007/0024202 A1* 2/2007 Lee ........................ G09G 3/296 315/160
2020/0412916 A1* 12/2020 Kobayashi ......... G03G 15/6585
2021/0021719 A1* 1/2021 Kobayashi ......... H04N 1/00331
2022/0174177 A1* 6/2022 Watanabe .......... H04N 1/00482
2023/0008198 A1* 1/2023 Gadde .................. G06V 30/412

FOREIGN PATENT DOCUMENTS

JP H06-350774 12/1994
JP 2007-037392 2/2007
JP 2011-150436 8/2011
JP 2022-086250 6/2022

* cited by examiner

*Primary Examiner* — Andrew H Lam
(74) *Attorney, Agent, or Firm* — IPUSA, PLLC

(57) ABSTRACT

An image processing apparatus includes circuitry; and a memory storing computer-executable instructions that cause the circuitry to execute detecting an error in a character, a word, or a sentence in image data; adding, to the image data, information of the detected error when the error is detected, as invisible information that cannot be viewed or that is difficult to view in an image represented by the image data; and controlling output of the image data by changing an output method of the image data in which the error is detected, based on a detection result of detecting the error or the invisible information.

15 Claims, 13 Drawing Sheets

1

300
CPU
301
ROM
302
RAM
303
HD
304
HDD CONTROLLER
305
DISPLAY
306
EXTERNAL DEVICE CONNECTION I/F
307
315
NETWORK I/F
308
KEYBOARD
309
POINTING DEVICE
310
DVD-RW DRIVE
312
311
MEDIUM I/F
314
MEDIUM
313

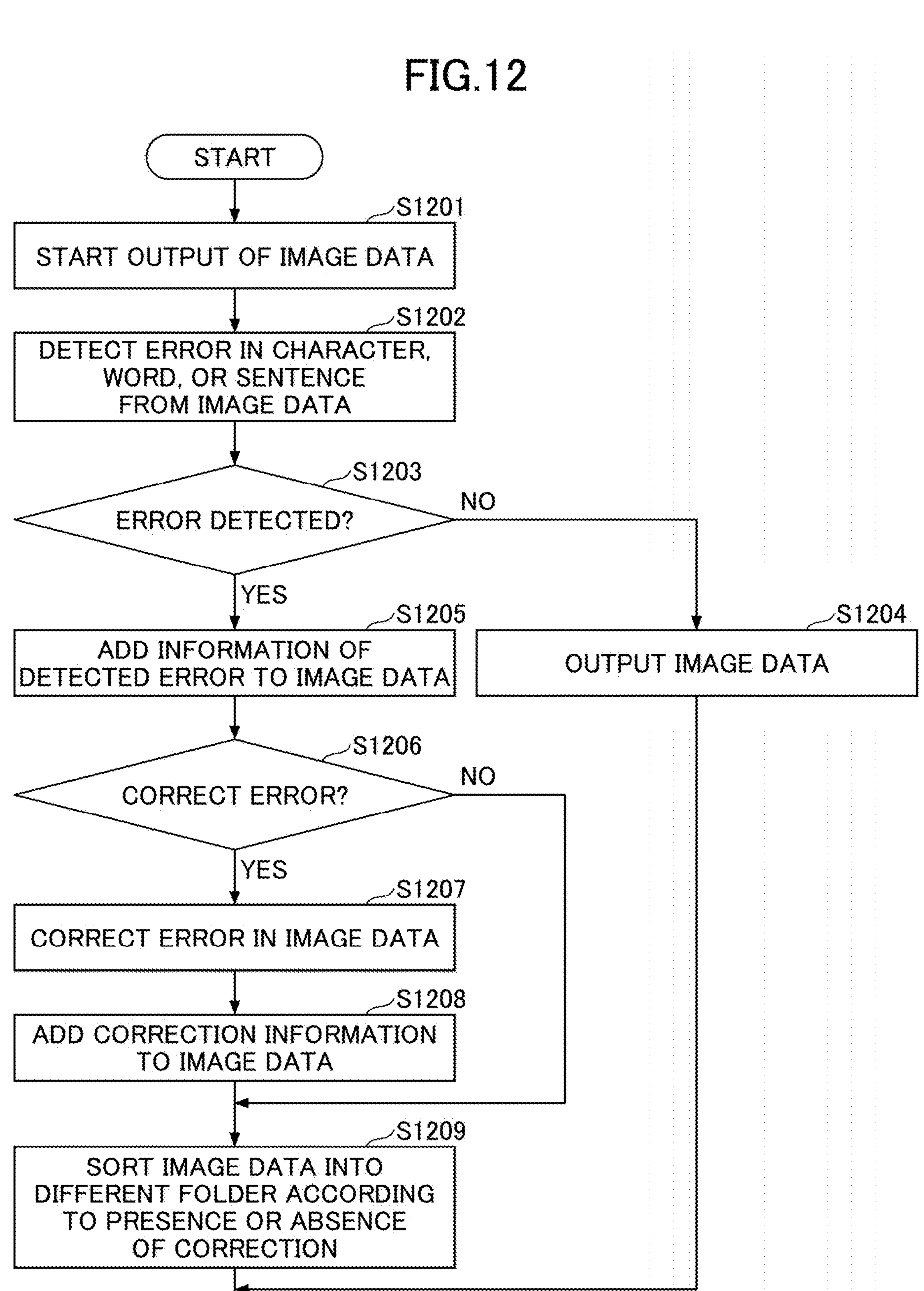
FIG.12
START
S1201
START OUTPUT OF IMAGE DATA
S1202
DETECT ERROR IN CHARACTER, WORD, OR SENTENCE FROM IMAGE DATA
S1203
ERROR DETECTED?
NO
YES
S1205
ADD INFORMATION OF DETECTED ERROR TO IMAGE DATA
S1204
OUTPUT IMAGE DATA
S1206
CORRECT ERROR?
NO
YES
S1207
CORRECT ERROR IN IMAGE DATA
S1208
ADD CORRECTION INFORMATION TO IMAGE DATA
S1209
SORT IMAGE DATA INTO DIFFERENT FOLDER ACCORDING TO PRESENCE OR ABSENCE OF CORRECTION
END

IMAGE PROCESSING APPARATUS, IMAGE PROCESSING METHOD, AND RECORDING MEDIUM FOR ADDING INVISIBLE ERROR INFORMATION AND CONTROLLING IMAGE DATA OUTPUT

CROSS-REFERENCE TO RELATED APPLICATION

The present application is based on and claims priority under 35 U.S.C. § 119 to Japanese Patent Application No. 2023-087154, filed on May 26, 2023, the contents of which are incorporated herein by reference in their entirety.

BACKGROUND OF THE INVENTION

1. Field of the Invention

The present invention relates to an image processing apparatus, an image processing method, and a recording medium.

2. Description of the Related Art

An image forming apparatus (image processing apparatus) equipped with a scanning function for generating image data by scanning an original document and distributing the generated image data to a predetermined distribution destination, a printing function for printing the image data, and the like is widely used.

Further, in the operation of processing character data, which is recognized by OCR (Optical Character Recognition/Reader), into editing data, a technology for automatically converting characters that may be misread into correct characters is known (see, e.g., Patent Document 1).

Patent Document 1: Japanese Unexamined Patent Application Publication No. 2011-150436

SUMMARY OF THE INVENTION

According to one aspect of the present invention, there is provided an image processing apparatus including circuitry; and a memory storing computer-executable instructions that cause the circuitry to execute:

detecting an error in a character, a word, or a sentence in image data;

adding, to the image data, information of the detected error when the error is detected, as invisible information that cannot be viewed or that is difficult to view in an image represented by the image data; and controlling output of the image data by changing an output method of the image data in which the error is detected, based on a detection result of detecting the error or the invisible information.

BRIEF DESCRIPTION OF THE DRAWINGS

FIG. 12 is a flowchart illustrating an example of output processing according to a third embodiment of the present invention;

DESCRIPTION OF THE EMBODIMENTS

There is demand to detect errors of characters, words, sentences, etc., in image data that is output (distributed or printed) by an image processing apparatus, to prevent output of image data in which errors are detected, and to enable a user to confirm errors in image data.

For example, by applying the technology disclosed in Patent Document 1, it is possible to convert characters that may be misread into correct characters and prevent the output of the image data in which an error is detected, but there is a problem that the user cannot confirm the error of the image data.

A problem to be addressed by an embodiment of the present invention is to prevent the output of image data in which an error is detected in an image processing apparatus that outputs image data, and enable a user to confirm the error in the image data.

Hereinafter, an embodiment of the present invention (the present embodiment) will be described in detail with reference to the drawings.

<System Configuration>

Figure 1:
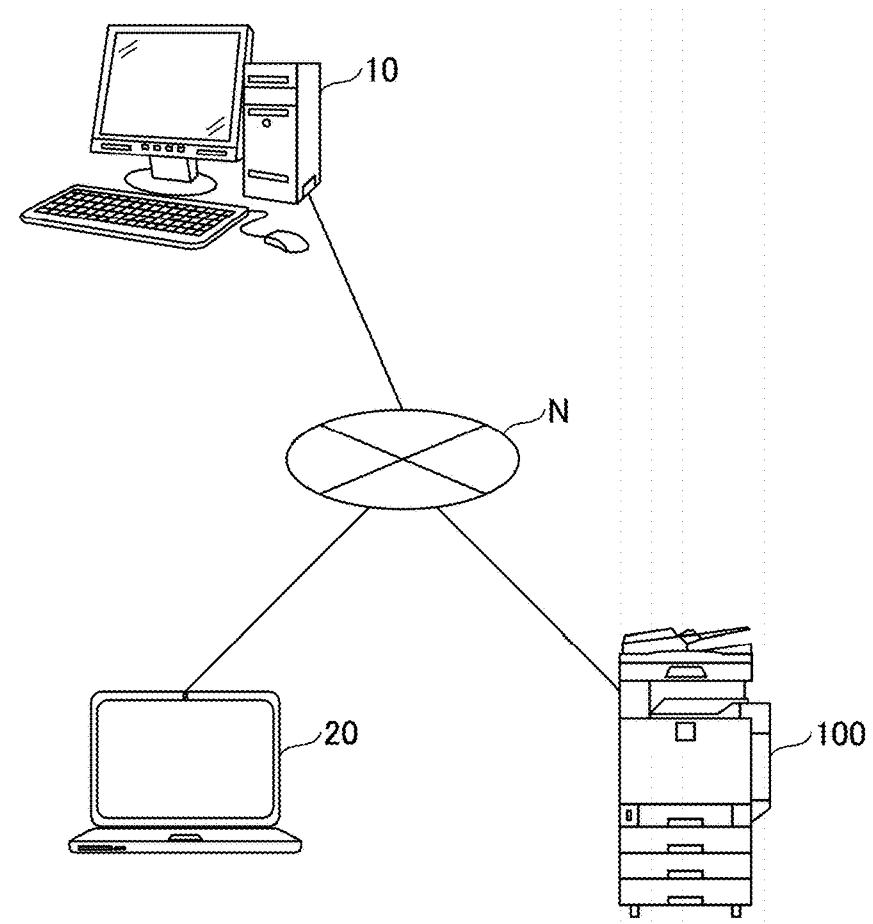
FIG. 1 is a diagram (1) illustrating an example of a system configuration of an image processing system according to an embodiment of the present invention.

FIG. 1 is a diagram (1) illustrating an example of a system configuration of an image processing system according to an embodiment. In the example of FIG. 1, an image processing system 1 includes, for example, a server apparatus 10, a user terminal 20, and an image forming apparatus 100 connected to the Internet and a communication network N such as a local area network (LAN).

The server apparatus 10 is, for example, an information processing apparatus with a computer configuration or a system configured by a plurality of computers. The server apparatus 10 receives, for example, a print job transmitted from the user terminal 20 used by a user, and stores and manages the received print job in a storage unit or the like. Further, the server apparatus 10 provides a list of print jobs registered by the user or a print job or the like to the image forming apparatus 100 in response to a request from the image forming apparatus 100 to which the user has logged in. Further, the server apparatus 10 has a folder for storing previously registered image data addressed to the user (such as scanned images scanned by the image forming apparatus 100).

The user terminal 20 is an information processing apparatus used by the user, such as a personal computer (PC), a tablet terminal, or a smartphone. The user terminal 20 can register, in the server apparatus 10, a print job including print target data such as document data, image data, or print data to be printed and print information according to the operation by the user. The user terminal 20 can acquire image data stored in a folder addressed to the user in the server apparatus 10 according to the operation by the user.

The image forming apparatus 100 (image processing apparatus) is an image processing apparatus having an image forming function such as a printing function or a scanning function, such as an multifunction peripheral (MFP), a printer, or a scanner. Herein, the image forming apparatus 100 is described as an MFP having a printing function and a scanning function. The image forming apparatus 100 is an example of an image processing apparatus according to the present embodiment.

For example, a user can use the image forming apparatus 100 to print data to be printed by displaying a list of print jobs registered in the server apparatus 10 by the user and selecting a print job from the list of print jobs.

Further, the user can specify a destination user in the operation screen of the image forming apparatus 100 and scan an original document with the image forming apparatus 100, for example, to distribute a scanned image or the like to a folder of a destination user in the server apparatus 10.

The system configuration of the image processing system 1 illustrated in FIG. 1 is an example. For example, the server apparatus 10 is not limited to a physical machine (computer) and may be implemented by a virtual machine or the like in a cloud. Further, the server apparatus 10 illustrated in the image processing system 1 may not be included.

Figure 2:
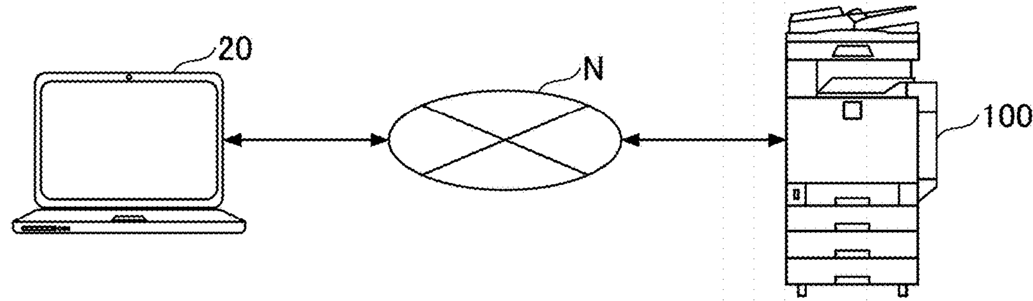
FIG. 2 is a diagram (2) illustrating an example of a system configuration of an image processing system according to an embodiment of the present invention.

In the example of FIG. 2, the user terminal 20 and the image forming apparatus 100 are communicatively connected via the communication network N. In this case, the user terminal 20 can transmit a print job including print target data such as document data, image data, or print data to be printed, and print information to the image forming apparatus 100 in accordance with an operation by the user. The image forming apparatus 100 executes a print process for printing the print target data based on the print job received from the user terminal 20. Further, the image forming apparatus 100 enables the user to distribute the scanned image or the like scanned by the image forming apparatus 100 to a predetermined folder of the user terminal 20.

The system configuration of the image processing system 1 illustrated in FIGS. 1 and 2 is an example. The image processing system 1 may have another configuration as long as the image processing system 1 implements a printing process in which the user prints (outputs) image data by using the image forming apparatus 100 or a process in which the image data scanned by the image forming apparatus 100 is distributed (output). For example, in FIG. 2, the user terminal 20 and the image forming apparatus 100 may be communicatively connected by a wired cable or the like. The image processing system 1 may include only the image forming apparatus 100.

(Outline of Process)

There is demand to detect errors in characters, words, sentences, or the like in the image data output (distributed or printed) by the image forming apparatus 100, to prevent the output of image data in which an error is detected, and to enable the user to confirm the errors in the image data.

For example, by applying the technology disclosed in Patent Document 1, it is possible to convert characters that may be misread into correct characters, and to prevent the output of the image data in which the errors are detected. However, in such a method, it is difficult for the user to confirm the errors in the image data. It is also difficult to apply this method to a printing process.

Therefore, the image forming apparatus 100 according to the present embodiment detects errors in characters, words, or sentences in the image data, and adds detected error information (information of the detected error) to the image data as invisible information that cannot be viewed or is difficult to view in the image displayed according to the image data.

As an example, the image forming apparatus 100 adds the detected error information as metadata of the image data. Here, the metadata is data describing various kinds of information related to the image data. The metadata may also be referred to as bibliographic information or bibliographic data. The metadata includes, for example, property information of image data or header information (or tag information) of a JPEG file.

As another example, the image forming apparatus 100 may add the detected error information to the image data by using a known digital watermarking technique.

The image forming apparatus 100 changes the output method of the image data in which an error is detected, based on a result of detecting errors in the image data or based on invisible information added to the image data. For example, the image forming apparatus 100 may sort the image data in which an error is detected into a predetermined folder. The image forming apparatus 100 may stop or suspend the output of the image data in which an error is detected. Further, the image forming apparatus 100 may output an alert before outputting the image data in which an error is detected. Further, the image forming apparatus 100 may present to the user a selection screen for selecting whether to output the image data or stop the output.

Further, as in the technology disclosed in Patent Document 1, the image forming apparatus 100 may, for example, use correct information such as dictionary data to correct characters, words, sentences, etc., in which errors have been detected, and distribute the corrected image data (such as a scanned image) to a predetermined distribution destination.

Thus, in the image forming apparatus 100 (image processing apparatus) for outputting image data, the output of image data in which an error has been detected is prevented, and the error of the image data can be confirmed by the user. For example, the user can confirm the error of the image data by checking the image data whose output has been stopped or the metadata of the image data sorted into a predetermined folder by a predetermined viewer or a viewer function of the image forming apparatus 100.

Further, in the present embodiment, the detected error information is added to the image data as invisible information that is not visible or difficult to be view in the image represented by the image data, and, therefore, the image data whose error has been detected can be output without being modified according to the determination of the user.

<Hardware Configuration>

(Hardware Configuration of Server Apparatus and User Terminal)

Figure 3:
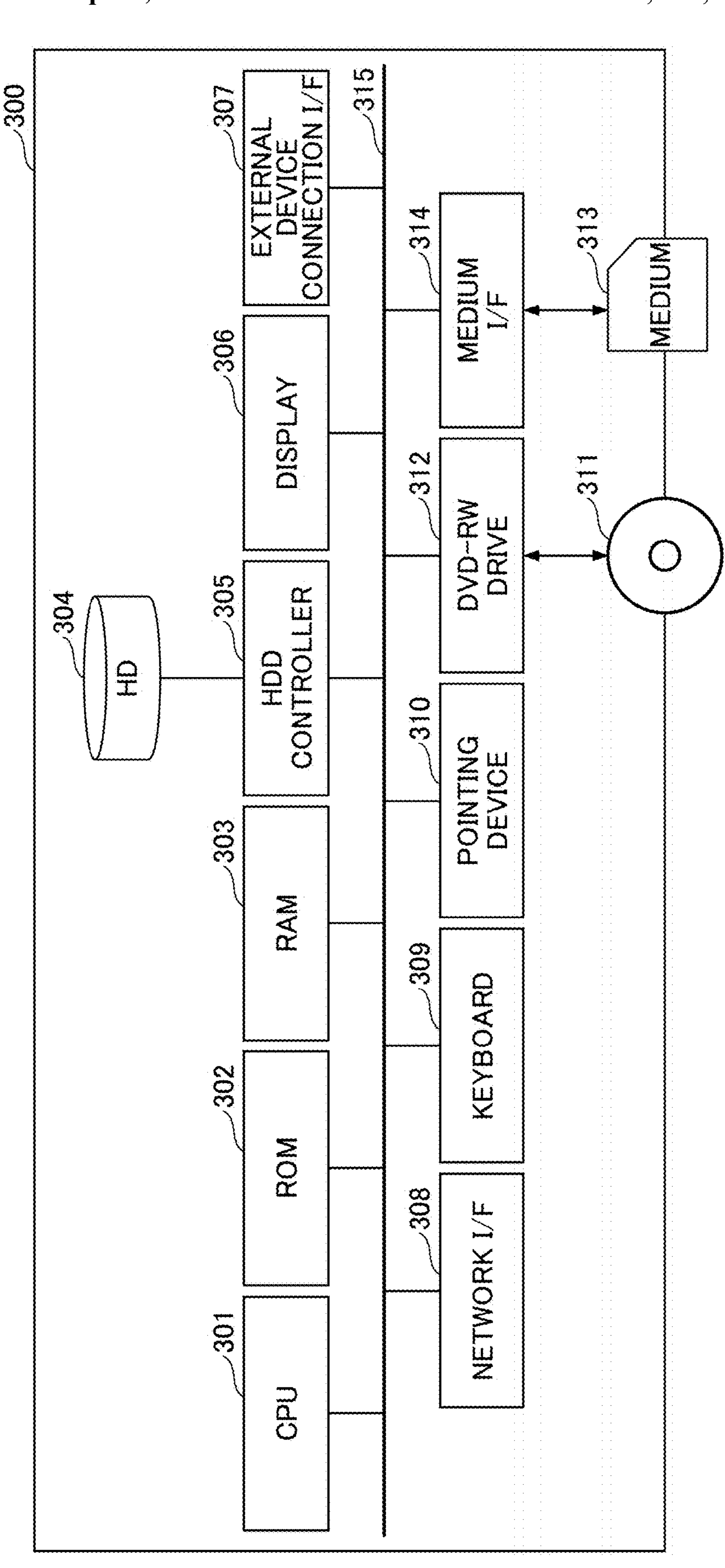
FIG. 3 is a diagram illustrating an example of a hardware configuration of a computer according to an embodiment of the present invention.

The server apparatus 10 and the user terminal 20 have, for example, a hardware configuration of a computer 300 as illustrated in FIG. 3. The server apparatus 10 may be configured by a plurality of computers 300.

FIG. 3 is a diagram illustrating an example of a hardware configuration of a computer according to an embodiment. For example, as illustrated in FIG. 3, the computer 300 includes a Central Processing Unit (CPU) 301, a Read Only Memory (ROM) 302, a Random Access Memory (RAM) 303, a Hard Disk (HD) 304, a Hard Disk Drive (HDD) controller 305, a display 306, an external device connection interface (I/F) 307, a network I/F 308, a keyboard 309, a pointing device 310, a Digital Versatile Disk Rewritable (DVD-RW) drive 312, a medium I/F 314, and a bus line 315.

Among these, the CPU 301 controls the operation of the entire computer 300. The ROM 302 stores programs used to start the computer 300, such as Initial Program Loader (IPL), for example. The RAM 303 is used, for example, as a work area of the CPU 301. The HD 304 stores, for example, programs such as the operating system (OS), applications, a printer driver, and various kinds of data. The HDD controller 305 controls, for example, the reading or writing of various kinds of data with respect to the HD 304 under the control of the CPU 301.

The display 306 displays various kinds of information, for example, a cursor, a menu, a window, a character, or an image. The external device connection I/F 307 is an interface for connecting various external devices to the computer 300. The network I/F 308 is an interface for connecting the computer 300 to the communication network N. The keyboard 309 is a type of input means having a plurality of keys for inputting characters, numbers, various instructions, etc. The pointing device 310 is a type of input means for selecting and executing various instructions, selecting a processing target, moving a cursor, etc.

The DVD-RW drive 312 controls the reading or writing of various kinds of data with respect to a DVD-RW 311 as an example of a removable recording medium. The medium is not limited to the DVD-RW 311, but may be another removable recording medium. The medium I/F 314 controls the reading or writing (storage) of data with respect to a medium 313 such as a flash memory. The bus line 315 includes an address bus, a data bus, various control signals, etc., for electrically connecting the above elements.

(Hardware Configuration of the Image Forming Apparatus)

Figure 4:
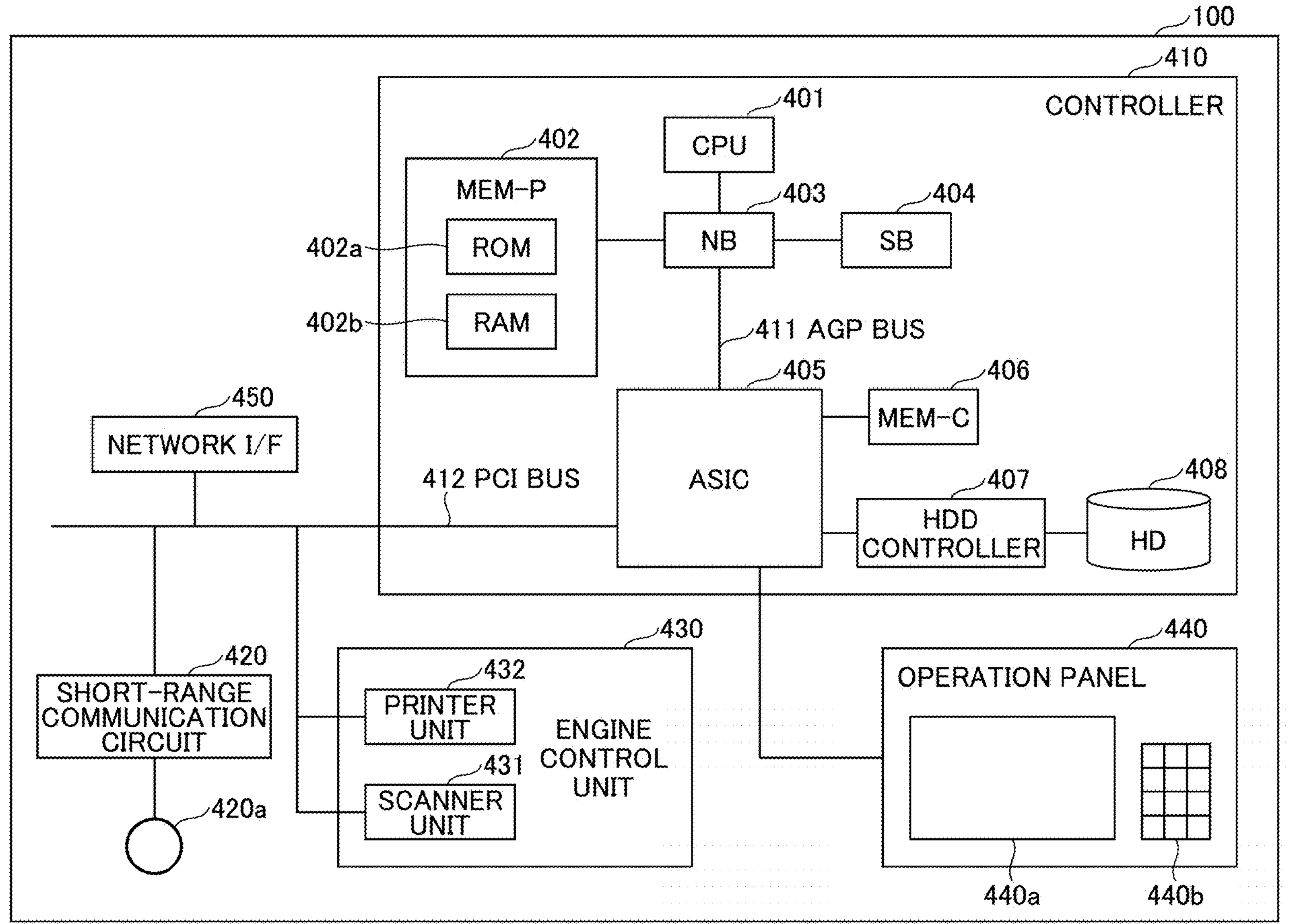
FIG. 4 is a diagram illustrating an example of a hardware configuration of an image forming apparatus according to an embodiment of the present invention.

FIG. 4 is a diagram illustrating an example of a hardware configuration of the image forming apparatus according to an embodiment. For example, as illustrated in FIG. 4, the image forming apparatus 100 includes a controller 410, a short-range communication circuit 420, an engine control unit 430, an operation panel 440, and a network I/F 450.

Among these, the controller 410 includes a CPU 401, a system memory (MEM-P) 402, a North Bridge (NB) 403, a South Bridge (SB) 404, an ASIC (Application Specific Integrated Circuit) 405, a local memory (MEM-C) 406, an HDD controller 407, an HD 408, etc., which are the main elements of the computer, and the NB 403 and the ASIC 405 are connected by an AGP (Accelerated Graphics Port) bus 411.

Among these, the CPU 401 is a control unit that performs overall control of the image forming apparatus 100. The NB 403 is a bridge for connecting the CPU 401 to the MEM-P 402, the SB 404, and the AGP bus 411, and has a memory controller that controls reading and writing with respect to the MEM-P 402, a Peripheral Component Interconnect (PCI) master, and an AGP target.

The MEM-P 402 is composed of a ROM 402*a* that is a memory for storing programs and data for implementing each function of the controller 410, and a RAM 402*b* that is used as a memory for rendering when expanding programs and data, and a printing memory. The programs stored in the RAM 402*b* may be provided as installable or executable files recorded on a computer-readable recording medium such as a compact disc read-only memory (CD-ROM), a CD recordable (CD-R), or a digital versatile disc (DVD).

The SB 404 is a bridge for connecting the NB 403 to PCI devices and peripheral devices. The ASIC 405 is an integrated circuit (IC) for image processing applications having hardware elements for image processing, and serves as a bridge for connecting the AGP bus 411, the PCI bus 412, the HDD controller 407, and the MEM-C 406, respectively. The ASIC 405 includes a PCI target and an AGP master, an arbiter (ARB) which is the core of the ASIC 405, a memory controller which controls the MEM-C 406, a plurality of DMACs (Direct Memory Access Controllers) which rotate image data by hardware logic, etc., and a PCI unit which transfers data via the PCI bus 412 between the scanner unit 431 and the printer unit 432. A Universal Serial Bus (USB) interface or an IEEE 1394 (Institute of Electrical and Electronics Engineers 1394) interface may be connected to the ASIC 405.

The MEM-C 406 is a local memory used as a copy image buffer and a code buffer. The HD 408 is a storage for storing image data, storing font data used for printing, and storing forms. The HDD controller 407 controls reading or writing of data with respect to the HD 408 under control of the CPU 401. The AGP bus 411 is a bus interface for graphics accelerator cards proposed to speed up graphics processing, and can speed up graphics accelerator cards by directly accessing the MEM-P 402 at high throughput.

The short-range communication circuit 420 performs various kinds of short-range wireless communication by using an antenna 420*a* or the like for the short-range communication circuit. The engine control unit 430 includes, for example, a scanner unit 431 and a printer unit 432. The scanner unit 431 is a reading device for reading an original document or the like. The printer unit 432 is a printing device for printing print data on a print medium. The scanner unit 431 or the printer unit 432 includes image processing units such as error diffusion and gamma conversion, for example.

The operation panel 440 includes a panel display unit 440*a*, such as a touch panel, which displays the current setting value, a selection screen, and the like and receives input from an operator, and operation buttons 440*b*, which include a numeric keypad for receiving the setting value of conditions related to image formation, such as a setting condition of density, and a start key for receiving a copy start instruction. The controller 410 controls the entire image forming apparatus 100 and controls, for example, drawing, communication, input from the operation panel 440, and the like.

The network I/F 450 is an interface for data communication using the network. The short-range communication circuit 420 and the network I/F 450 are electrically connected to the ASIC 405 via the PCI bus 412, for example.

<Functional Configuration>

Figure 5:
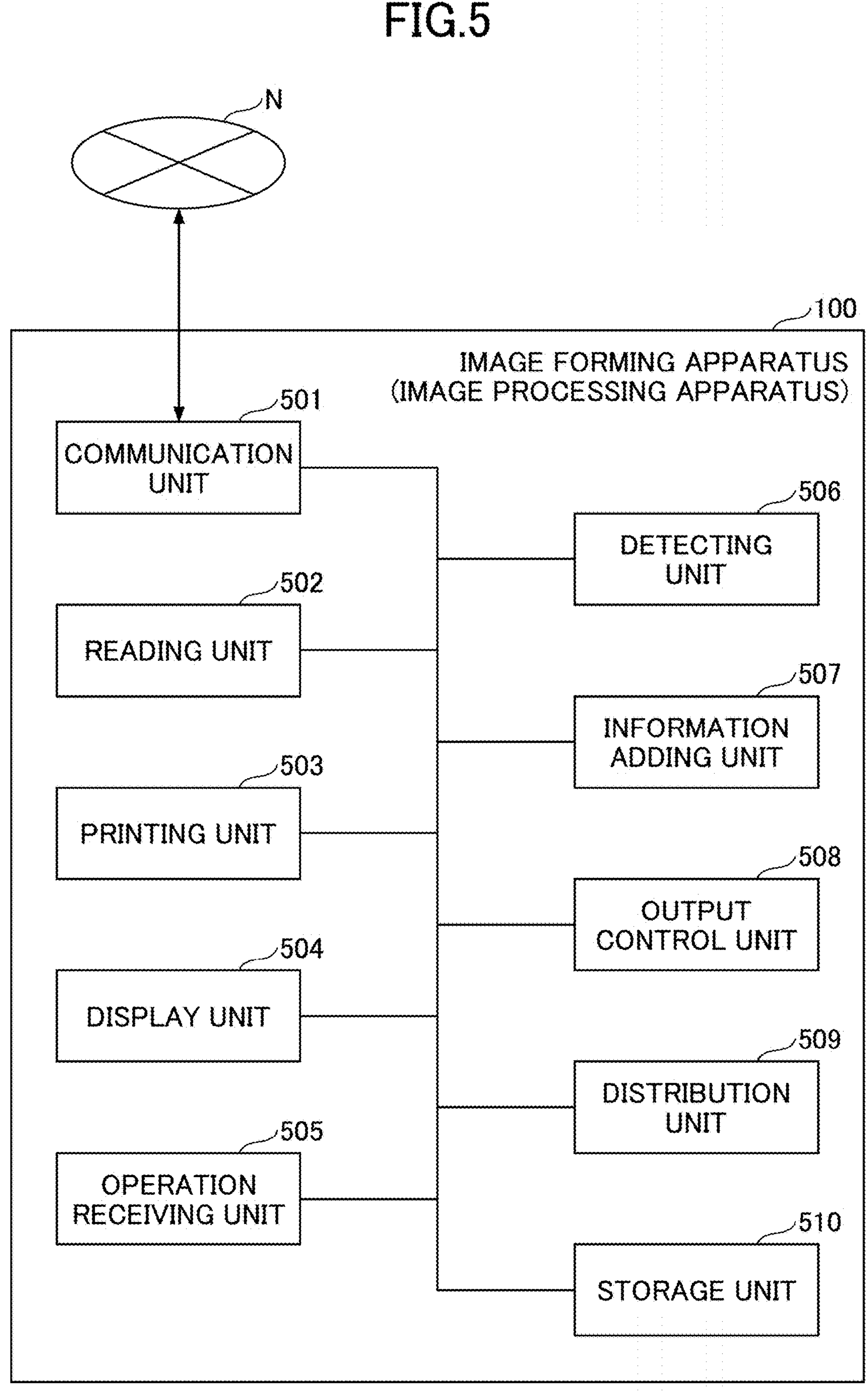
FIG. 5 is a diagram illustrating an example of a functional configuration of an image forming apparatus according to an embodiment of the present invention.

FIG. 5 is a diagram illustrating an example of functional configurations of the image forming apparatus according to an embodiment. The image forming apparatus 100 implements functional configurations such as a communication unit 501, a reading unit 502, a printing unit 503, a display unit 504, an operation receiving unit 505, a detecting unit 506, an information adding unit 507, an output control unit 508, and a distribution unit 509 by executing a predetermined program by the CPU 401. Note that at least some of the above functional configurations may be implemented by hardware.

The image forming apparatus 100 implements the storage unit 510 by, for example, the HD 408, the HDD controller 407, the MEM-C 406, and a MEM-P.

The communication unit 501 connects the image forming apparatus 100 to the communication network N by using, for example, the network I/F 450 and executes communication processing for communicating with the server apparatus 10 or the user terminal 20.

The reading unit 502 controls, for example, the engine control unit 430 and the scanner unit 431 and executes reading processing for scanning (reading) an original document and generating image data. The printing unit 503 controls, for example, the engine control unit 430 and the printer unit 432 and executes printing processing for printing print data (image data).

The display unit 504 executes display processing for displaying various display screens on, for example, the operation panel 440. The operation receiving unit 505 executes operation reception processing for receiving a user's input operation to the operation panel 440, for example.

The detecting unit 506 executes detection processing for detecting an error in a character, a word, or sentence in the image data. As an example, the detecting unit 506 extracts characters by applying a known character recognition technique such as Optical Character Recognition/Reader (OCR) to the image data. The detecting unit 506 determines an error in a character, a word, or a sentence in the scanned image in the image data based on a character extraction result by OCR or the like. Here, the image data includes a scanned image scanned by the reading unit 502 or print data to be printed by the printing unit 503.

As another example, the detecting unit 506 may detect errors in characters, words, or sentences by using, for example, a spell check function of a sentence creation application that has created sentence data to be printed. For example, the user terminal 20 may send a print job including the result of spell check executed by the sentence creation application to the server apparatus 10 or the image forming apparatus 100, and the detecting unit 506 may detect errors in characters, words, or sentences based on the spell check result. Alternatively, the user terminal 20 may send a print job including the sentence data created by the sentence creation application to the server apparatus 10 or the image forming apparatus 100. In this case, the server apparatus 10 or the image forming apparatus 100 may check the spelling of the sentence data by using the spell check function of the sentence creation application, and may detect errors in characters, words, or sentences based on the spell check result.

When an error is detected by the detecting unit 506, the information adding unit 507 executes information addition processing to add the detected error information to the image data as invisible information that is not visible or difficult to be viewed in the image represented by the image data. As an example, the information adding unit 507 adds the information of the error detected by the detecting unit 506 as metadata of the image data. As another example, the image forming apparatus 100 may add the detected error information to the image data as a digital watermark. The information of the error detected by the detecting unit 506 may include, for example, information such as the presence or absence of errors, the number of errors, the range of errors, or the content of errors (OCR results, spell check results, etc.).

The output control unit 508 executes output control processing for controlling the output (distribution or printing) of image data. The output control unit 508 changes the output method of the image data in which an error is detected based on the information of the error detected by the detecting unit 506 or the invisible information added to the image data by the information adding unit 507.

For example, the output control unit 508 stops or suspends the output of the image data in which an error is detected based on the error information or the invisible information. Thus, the output control unit 508 can prevent the output of the image data in which an error is detected. Further, the user can recognize that the image data has an error when the output of the image data is stopped, and, therefore, it becomes easy to confirm the image data in which the error exists.

Alternatively, the output control unit 508 may sort the image data in which an error is detected into a predetermined folder based on the error information or the invisible information. Thus, the user can easily confirm the image data in which an error is detected by confirming the predetermined folder. Further, the output control unit 508 can prevent the output of the image data in which an error is detected by stopping or suspending the output of the image data stored in the predetermined folder.

Alternatively, the output control unit 508 may report to the user that there is an error in the image data before outputting the image data in which an error is detected based on the error information or invisible information. Further, the output control unit 508 may provide the user with the content of the error in the image data by this report and allow the user to select whether to perform the output or to cancel the output.

Alternatively, the output control unit 508 may correct the error in the image data in which an error is detected based on the error information or the invisible information. For example, the output control unit 508 may correct the characters, words, sentences, etc., in which an error is detected, by using correct information such as dictionary data, as in the technique disclosed in Patent Document 1. In the present embodiment, the language of the characters, words, sentences, etc., may be any language.

Preferably, when the output control unit 508 corrects an error in the image data in which an error is detected, the information adding unit adds correction information indicating that the error in the image data has been corrected to the image data as invisible information described above.

The distribution unit 509 executes distribution processing for distributing the image data to a predetermined distribution destination in accordance with control by the output control unit 508. The storage unit 510 stores various kinds of data, information, programs, etc., using the image forming apparatus 100.

The functional configurations of the image forming apparatus 100 illustrated in FIG. 5 are examples. As will be described later, among the functional configurations provided in the image forming apparatus 100, some of the functional configurations may be provided in the server apparatus 10 or the like.

<Processing Flow>

Next, the processing flow of the image processing method according to the present embodiment will be described.

First Embodiment (Distribution Processing 1)

Figure 6:
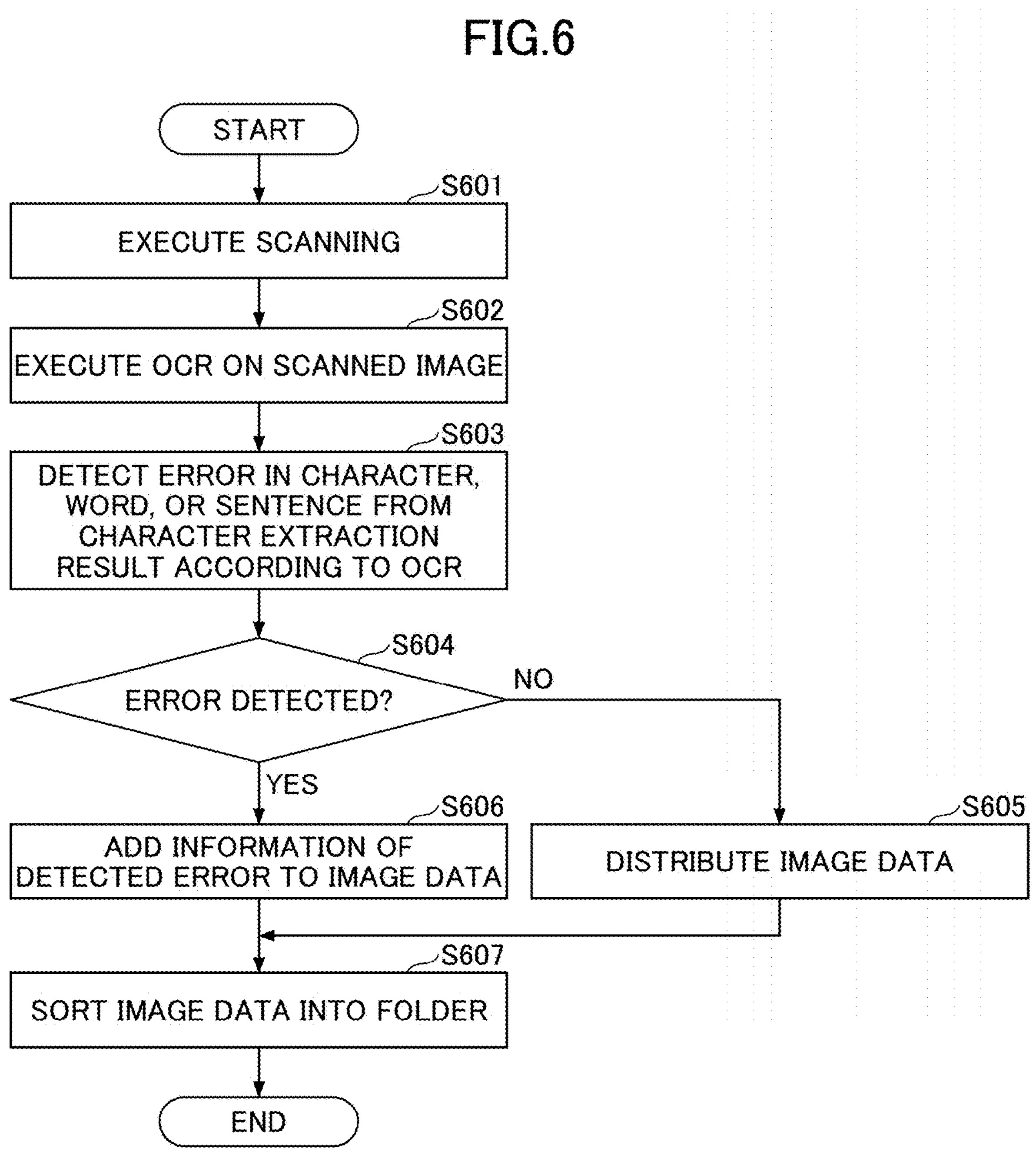
FIG. 6 is a flowchart (1) illustrating an example of distribution processing according to a first embodiment of the present invention.

FIG. 6 is a flowchart (1) illustrating an example of distribution processing according to the first embodiment. This processing indicates, for example, an example of distribution processing in which the image forming apparatus 100 having each of the functional configurations illustrated in FIG. 5 distributes a scanned image (image data) to a predetermined distribution destination.

In step S601, the reading unit 502 generates a scanned image obtained by scanning an original document by using the scanner unit 431.

In step S602, the detecting unit 506 extracts character data from the scanned image by performing OCR on the scanned image generated by the reading unit 502. The process in step S602 may be executed by the reading unit 502.

In step S603, the detecting unit 506 detects an error in a character, word, or sentence from the result of extracting the character by OCR.

In step S604, the output control unit 508 determines whether an error has been detected by the detecting unit 506. If no error has been detected, the output control unit 508 shifts the processing to step S605. On the other hand, if an error has been detected, the output control unit 508 shifts the processing to step S606.

When the processing shifts to step S605, the output control unit 508 distributes the image data to a predetermined distribution destination by using the distribution unit 509. For example, the output control unit 508 distributes the image data to a destination folder specified by the user of the server apparatus 10. The image data to be distributed may be a scanned image scanned by the reading unit 502 or may be an OCR image obtained by adding character data extracted by performing OCR on the scanned image.

When the process shifts to step S606, the information adding unit 507 adds the detected error information to the image data as invisible data. For example, the information adding unit 507 adds the detected error information to the metadata of the image data.

Figure 7:
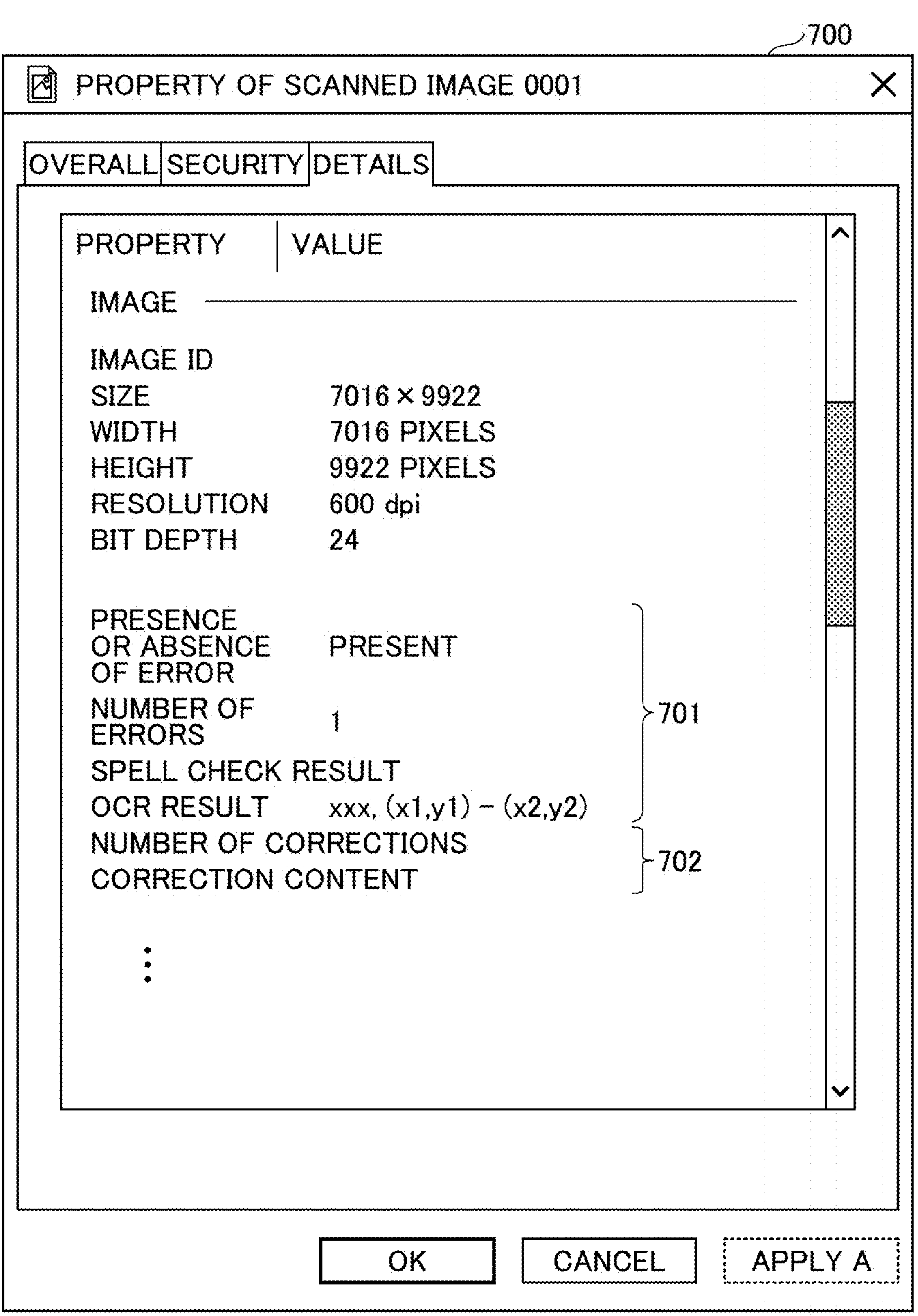
FIG. 7 is a diagram for explaining information added to image data according to an embodiment of the present invention.

FIG. 7 is a diagram for explaining the error information added to the image data according to an embodiment. This diagram illustrates an example of displaying a property screen 700 of the image data by using the function of the OS. As described above, the information adding unit 507 may add the detected error information as the property information of the image data.

In the example of FIG. 7, as the error information 701, information such as "presence or absence of error", "number of errors", "result of spell check", "OCR result", "number of corrections", and "correction content" is added to the property screen 700 of the image data.

"Presence or absence of error" is information indicating whether there is a detected error. "Number of errors" is information indicating the number of detected errors. When the error information includes "number of errors", the information adding unit 507 may indicate the presence or absence of an error according to whether "number of errors" is "0" instead of "presence or absence of errors".

"Spell check result" is information indicating the result of the spell check. For example, when an error is found by the spell check, "spell check result" stores a list of information such as characters, words, or sentences in which the error is found.

Figure 8:
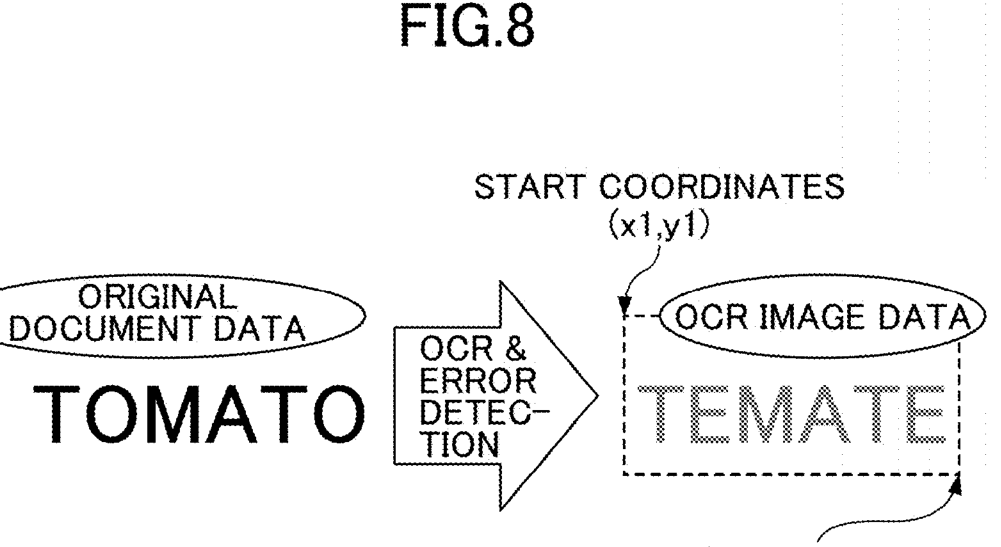
FIG. 8 is a diagram for explaining an example of OCR results according to an embodiment of the present invention.

"OCR result" is information indicating the OCR result. For example, when an error is found in the OCR character extraction result, the "OCR result" includes the character, word, sentence, etc., in which the error is found and coordinate information indicating the position of the character, word, sentence, etc., in which the error is found. For example, as illustrated in FIG. 8, it is assumed that the word "tomato" in the original document data is extracted as a word "temate" in the OCR and the OCR image data in which the error detected. In this case, the "OCR result" stores the start coordinate (x1, y1) and the end coordinate (x2, y2) of the word "temate" in which the error is found.

The information adding unit 507 is not limited to adding the detected error information to property information, but may add the detected error information to, for example, the header information or the tag information of the image data. The information adding unit 507 may add the detected error information to the image data by a digital watermark. Further, the information adding unit 507 may add the detected error information to a layer different from the image of the image data, for example. Further, the information adding unit 507 may add characters, words, sentences, etc., in which an error is detected, as visible information such as markers.

Now, returning to FIG. 6, the description of the flowchart continues. In step S607, the output control unit 508 sorts the image data into folders. For example, the output control unit 508 sorts the image data in which an error is detected into a predetermined folder. Alternatively, the output control unit 508 may store the image data in which no error is detected into a first folder, and store the image data in which an error is detected into a second folder different from the first folder. Further, the output control unit 508 may sort the image data in which an error is detected into different folders according to the error information (number of errors or content of errors, etc.), for example.

By the process of FIG. 6, the output control unit 508 can change the output method of the image data in which an error is detected based on the error detection result by the detecting unit 506.

(Distribution Processing 2)

Figure 9:
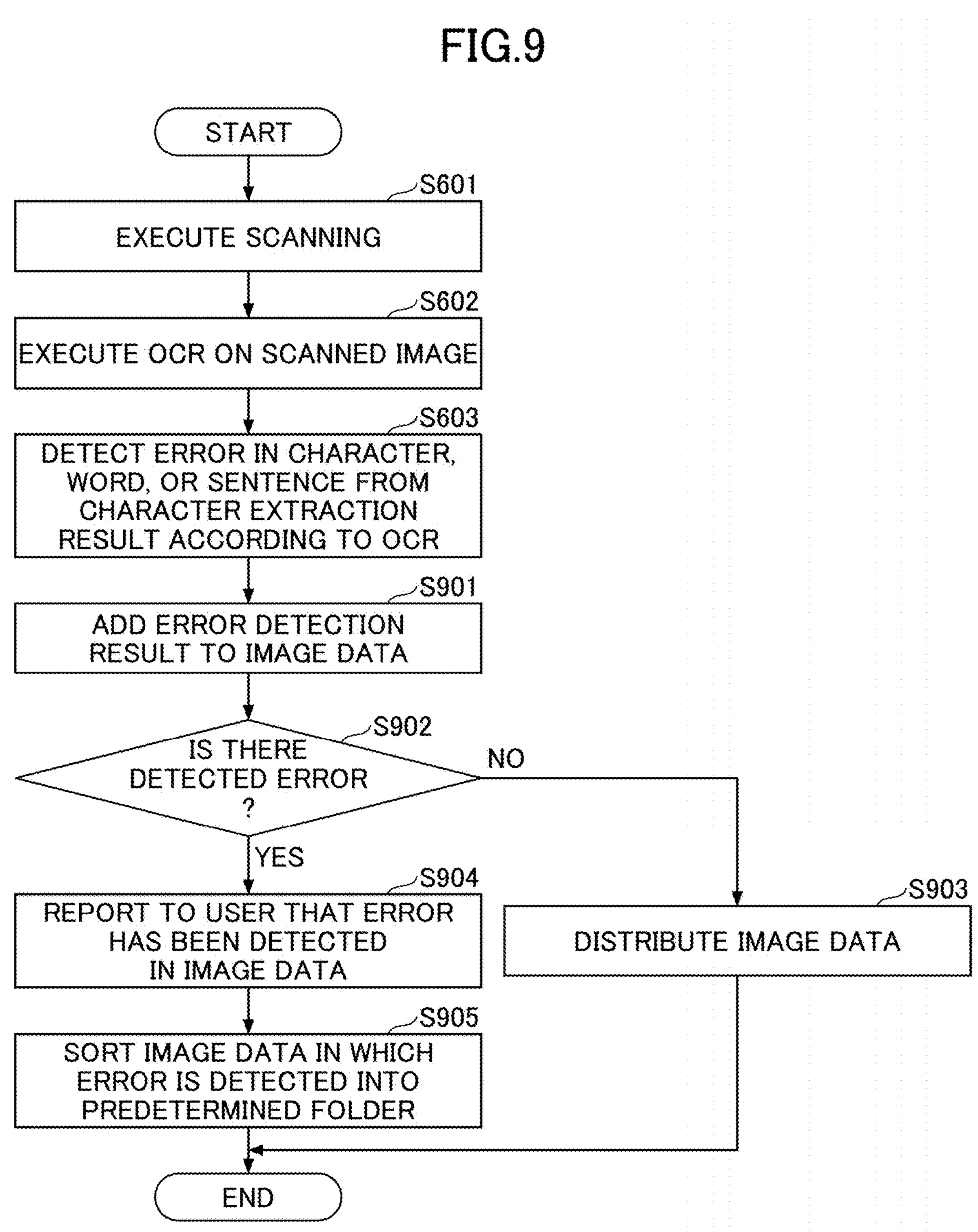
FIG. 9 is a flowchart (2) illustrating an example of distribution processing according to the first embodiment of the present invention.

FIG. 9 is a flowchart (2) illustrating an example of the distribution processing according to the first embodiment. This processing illustrates, for example, another example of the distribution processing in which the image forming apparatus 100 having each of the functional configurations described in FIG. 5 distributes the scanned image (image data) to a predetermined distribution destination. Among the processes illustrated in FIG. 9, the processes in steps S601 to S603 are the same as those described in FIG. 6, and, therefore, the descriptions thereof are omitted here.

In step S901, the information adding unit 507 adds the error detection result obtained by the detecting unit 506 to the image data as invisible information. For example, the information adding unit 507 adds the error detection result to the metadata of the image data. Thus, the information adding unit 507 may add the error detection result as invisible information to the image data in which no error is detected.

In step S902, the output control unit 508 determines whether there is an error detected by the detecting unit 506 in the image data based on the invisible information added to the image data. If there is no detected error, the output control unit 508 shifts the processing to step S903. On the other hand, if there is a detected error, the output control unit 508 shifts the processing to step S904. In this way, the output control unit 508 may determine whether there is a detected error in the image data based on the invisible information added to the image data.

When the processing shifts to step S903, the output control unit 508 distributes the image data to a predetermined distribution destination by using the distribution unit 509. This process may be similar to the process in step S605 in FIG. 6.

When the processing shifts to step S904, the output control unit 508 reports, to the user, that an error has been detected in the image data. For example, the output control unit 508 uses the display unit 504 to display, on the operation panel 440 or the like, a report screen indicating that an error has been detected in the image data. The output control unit 508 may display information about the detected error on the report screen indicating that an error has been detected in the image data. Furthermore, the output control unit 508 may display a selection button for selecting whether to distribute the image data or to cancel the distribution of the image data on the report screen indicating that an error has been detected in the image data, and may determine whether to distribute the image data or to cancel the distribution of the image data according to the user's selection operation.

In step S905, the output control unit 508 sorts the image data in which an error has been detected into a predetermined folder. Thus, the output control unit 508 may omit sorting of the distributed image data.

By the process of FIG. 9, the output control unit 508 can change the output method of the image data in which an error is detected based on the invisible information added to the image data.

Second Embodiment (Printing Processing 1)

Figure 10:
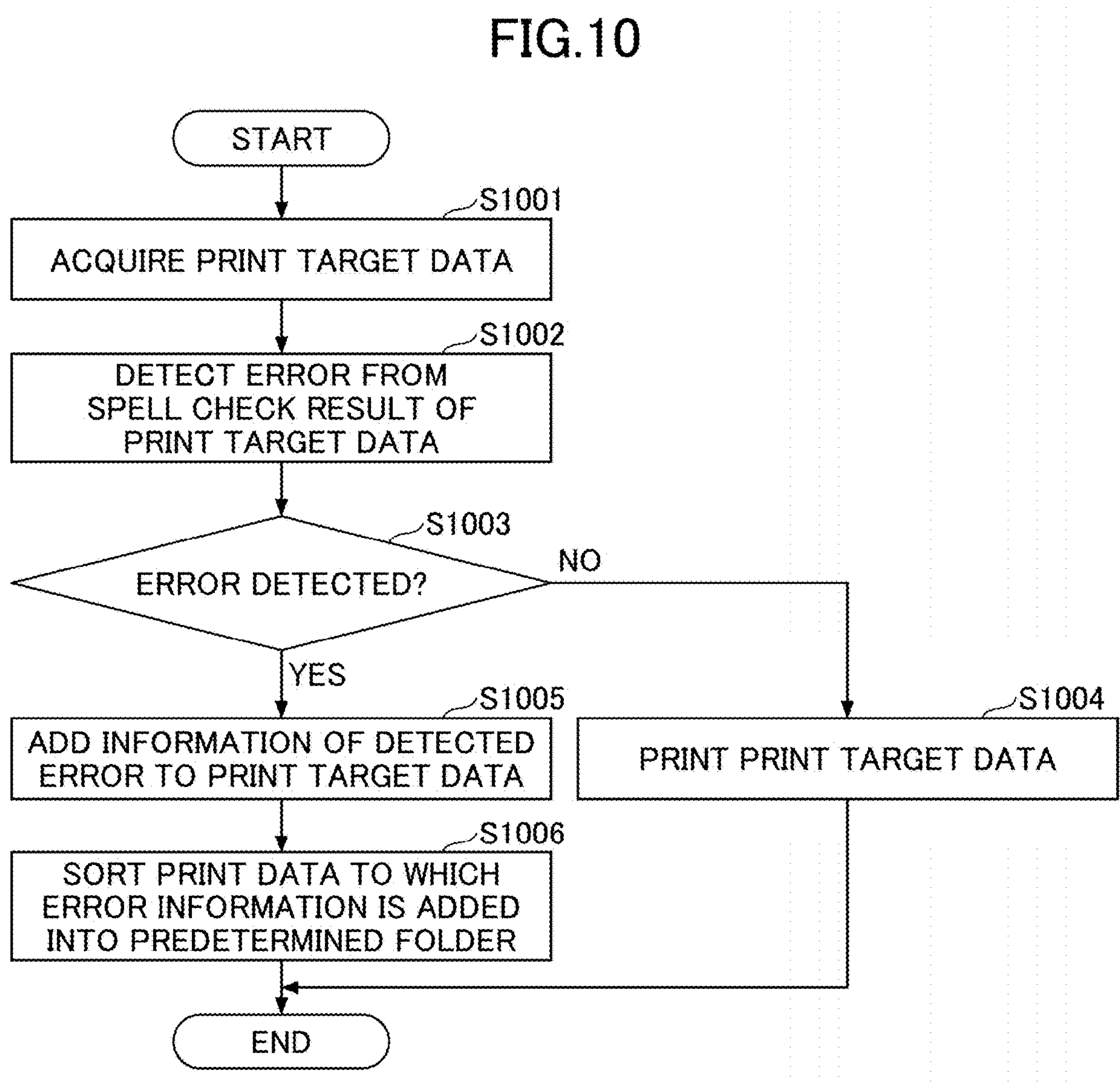
FIG. 10 is a flowchart (1) illustrating an example of printing processing according to a second embodiment of the present invention.

FIG. 10 is a flowchart (1) illustrating an example of printing processing according to the second embodiment. This processing illustrates, for example, an example of a printing processing in which the image forming apparatus 100 having each of the functional configurations described in FIG. 5 prints data to be printed (print target data).

In step S1001, the printing unit 503 acquires print target data from, for example, the server apparatus 10 or the user terminal 20.

In step S1002, the detecting unit 506 detects an error from the spell check result of the print target data. For example, when the acquired print target data (print data) includes a spell check result executed by a sentence creation application, the detecting unit 506 detects an error in a character, word, or sentence of the print target data based on the spell check result.

Alternatively, when the acquired print target data (print job) includes sentence data created by the sentence creation application, the detecting unit 506 checks the spelling of the sentence data by using the spell check function of the sentence creation application or the like. Further, the detecting unit 506 may detect errors in characters, words, or sentences based on the spell check result.

In step S1003, the output control unit 508 determines whether the error has been detected by the detecting unit 506. If no error has been detected, the output control unit 508 shifts the processing to step S1004. On the other hand, if an error has been detected, the output control unit 508 shifts the processing to step S1005.

When the processing shifts to step S1004, the printing unit 503 prints the print target data. On the other hand, when the processing shifts to step S1004, the information adding unit 507 adds the detected error information to the image data as invisible data. For example, the information adding unit 507 adds the detected error information to the metadata of the image data.

In step S1006, the output control unit 508 sorts the print target data to which the detected error information is added into a predetermined folder.

By the processing illustrated in FIG. 10, the output control unit 508 can change the output method of the print target data in which an error is detected based on the spell check result of the print target data (image data).

(Printing Processing 2)

Figure 11:
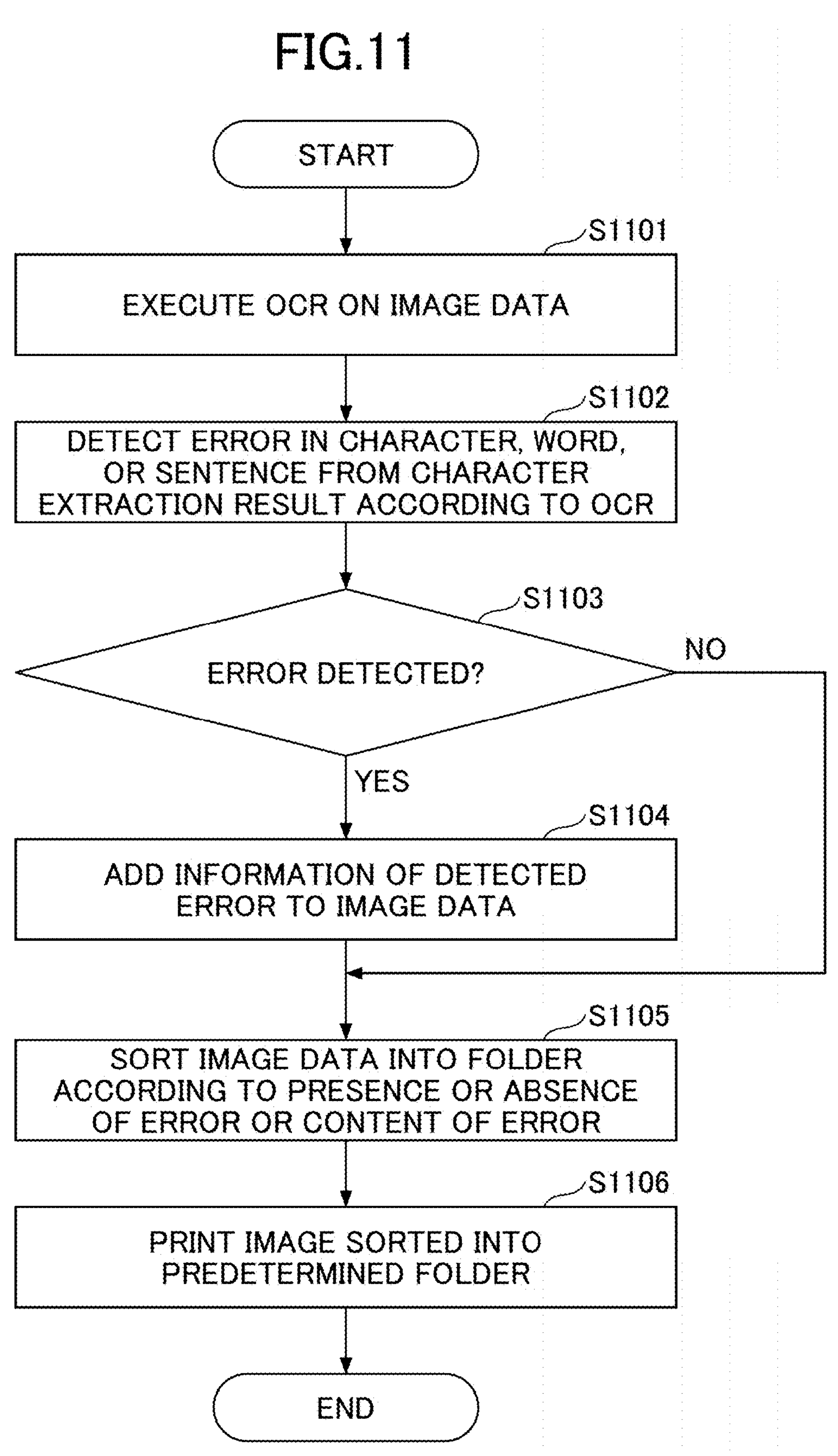
FIG. 11 is a flowchart (2) illustrating an example of output processing according to the second embodiment of the present invention.

FIG. 11 is a flowchart (2) illustrating an example of a printing processing according to the second embodiment. This process illustrates, for example, another example of a printing processing in which the image forming apparatus 100 having each of the functional configurations described in FIG. 5 prints the print target data.

In step S1101, the detecting unit 506 executes OCR on the print target image data. Here, the print target image data may be, for example, a scanned image scanned by the reading unit 502 or print data acquired from the server apparatus 10 or the user terminal 20.

In step S1102, the detecting unit 506 detects an error in a character, word, or sentence from the result of extracting the character by OCR.

In step S1103, the output control unit 508 determines whether an error has been detected by the detecting unit 506. If no error has been detected, the output control unit 508 shifts the processing to step S1105. On the other hand, if an error is detected, the output control unit 508 shifts the processing to step S1104.

When the processing shifts to step S1104, the information adding unit 507 adds the detected error information to the image data as invisible data. For example, the information adding unit 507 adds the detected error information to the metadata of the image data.

When the processing shifts to step S1105, the output control unit 508 sorts the image data into a folder according to the presence or absence of an error in the image data or the content of the error.

In step S1106, the output control unit 508 uses the printing unit 503 to print the image data sorted into a predetermined folder.

By the processing illustrated in FIG. 11, the output control unit 508 can change the output method of the print target data in which an error is detected, regardless of the spell check result of the print target data (image data).

Third Embodiment

FIG. 12 is a flowchart illustrating an example of image data output processing according to the third embodiment.

In step S1201, the image forming apparatus 100 starts image data output processing (distribution processing of image data or printing processing of image data).

In step S1202, the detecting unit 506 detects errors in characters, words, or sentences in the image data. Note that the error detection method may be based on the character extraction result of the OCR or the spell check result of the image data.

In step S1203, the output control unit 508 determines whether an error has been detected by the detecting unit 506. If no error is detected, the output control unit 508 shifts the processing to step S1204. On the other hand, if an error is detected, the output control unit 508 shifts the processing to step S1205.

When the processing shifts to step S1204, the output control unit 508 outputs (distributes or prints) the image data.

When the processing shifts to step S1205, the information adding unit 507 adds the detected error information to the image data as invisible data. For example, the information adding unit 507 adds the detected error information to the metadata of the image data.

In step S1206, the output control unit 508 determines whether to correct the error detected from the image data. As an example, when the error is detected in the image data, the image forming apparatus 100 defines setting information that allows the user or the administrator to set whether to correct the error. In this case, the output control unit 508 determines whether to correct the error detected in the image data based on the setting information set by the user or the administrator.

As another example, the output control unit 508 may use the display unit 504 to display a selection screen for selecting whether to correct the error on the operation panel 440 or the like, and determine whether to correct the error detected in the image data according to the selection operation by the user.

In step S1207, the output control unit 508 corrects the error detected in the image data. For example, the output control unit 508 may correct the characters, words, sentences, etc., in which the error is detected by using correct information such as dictionary data, as in the technique disclosed in Patent Document 1. Alternatively, the output control unit 508 may correct the characters, words, sentences, etc., in which an error is detected by using an external cloud service or the like that corrects the error in the characters, words, sentences, etc.

In step S1208, the information adding unit 507 adds correction information indicating that the image data has been corrected to the image data as invisible data. For example, the information adding unit 507 adds correction information to the metadata of the image data.

In step S1209, the output control unit 508 sorts the image data into different folders according to the presence or absence of correction. Thus, the output control unit 508 may change the output method of the image data in which an error is detected in various ways.

Figure 13:
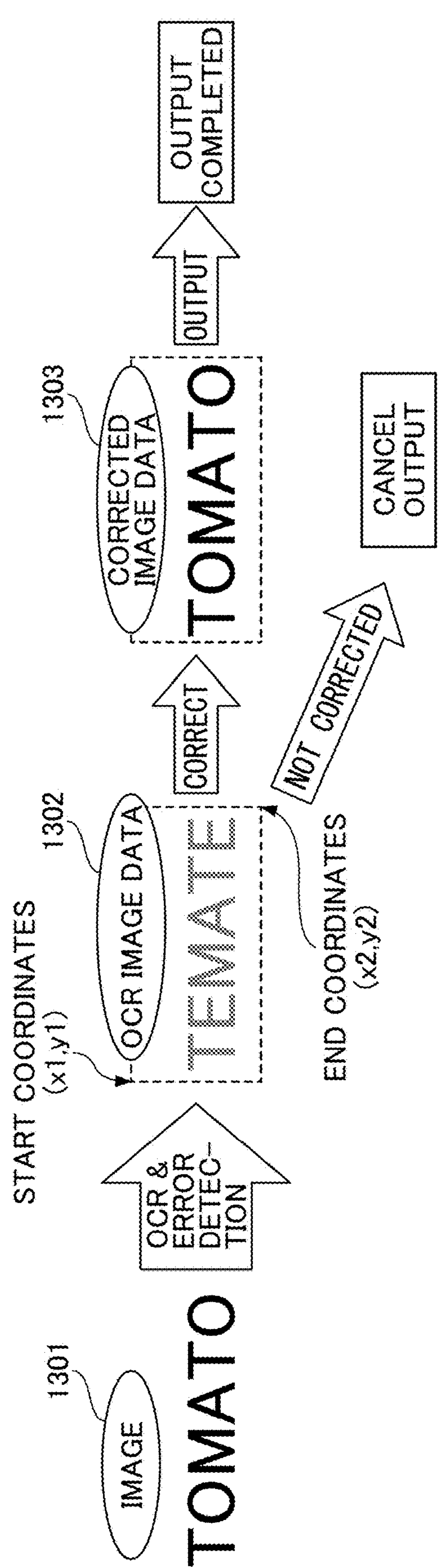
FIG. 13 is a diagram for explaining an example of output processing according to the third embodiment of the present invention.

FIG. 13 is a diagram for explaining an example of image data output processing according to the third embodiment. For example, the detecting unit 506 executes OCR on original document data 1301 and detects errors in characters, words, or sentences from OCR image data 1302.

When an error is detected in the OCR image data 1302, the output control unit 508 determines whether to correct the error. When the error is to be corrected, the output control unit 508 outputs (distribute or print) the corrected image data 1303 obtained by correcting the error in the OCR image data 1302 by, for example, sorting the corrected image data 1303 into an output folder. On the other hand, if an error is not corrected, the output control unit 508 cancels the output of the image data by, for example, sorting the uncorrected OCR image data 1302 in which the error has not been corrected into a folder for cancelling the output.

(Functional Configuration of Image Processing System)

Figure 14:
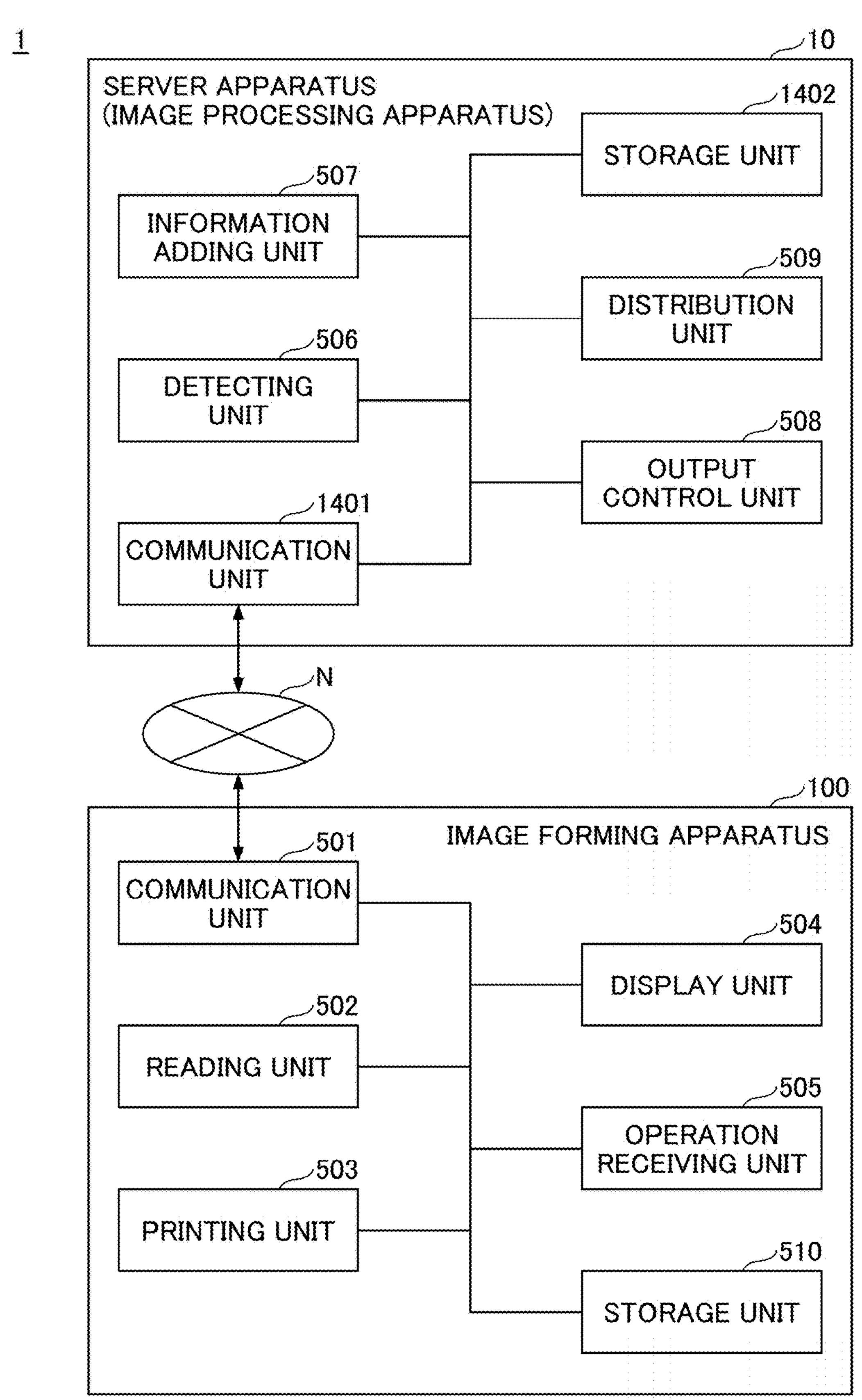
FIG. 14 is a diagram illustrating an example of a functional configuration of an image processing system according to an embodiment of the present invention.

FIG. 14 is a diagram illustrating an example of functional configurations of an image processing system according to an embodiment. As illustrated in FIG. 14, at least some of the functional configurations of the image forming apparatus 100 described in FIG. 5 may be provided in the server apparatus 10. In the example of FIG. 14, among the functional configurations of the image forming apparatus 100 described in FIG. 5, the server apparatus (image processing apparatus) includes the detecting unit 506, the information adding unit 507, the output control unit 508, and the distribution unit 509. A communication unit 1401 is a communication means provided in the server apparatus 10, and a storage unit 1402 is a storage means provided in the server apparatus 10.

In this case, for example, in the processing illustrated in FIG. 6, the reading unit 502 of the image forming apparatus 100 executes the process in step S601, and transmits the scanned image to the server apparatus 10. Further, the server apparatus 10 executes the processing from and after step S602.

In the example illustrated in FIG. 10, the server apparatus 10 executes the processes in steps S1001 to S1003, S1005, and S1006, and the process in step S1004 is executed by the printing unit 503 of the image forming apparatus 100 by having the server apparatus 10 transmit the print target data to the image forming apparatus 100.

Thus, the image processing apparatus according to the present embodiment may be the server apparatus 10. In this case, the existing image forming apparatus 100 can be used to implement the image processing system 1 according to the present embodiment.

According to the embodiments of the present invention, in the image processing apparatus that outputs image data, the output of the image data in which an error is detected is prevented, and the error in the image data can be confirmed by the user.

Supplementary Information

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

SUPPLEMENTARY NOTES

The following image processing apparatus, image processing method, and program are disclosed in the present specification.

Note 1

An image processing apparatus including a detecting unit for detecting an error in a character, a word, or a sentence in image data;

an information adding unit for adding, to the image data, information of the detected error when the error is detected, as invisible information that cannot be viewed or that is difficult to view in an image represented by the image data; and an output control unit for controlling output of the image data by changing an output method of the image data in which the error is detected, based on a detection result of detecting the error by the detecting unit or the invisible information.

Note 2

The image processing apparatus according to note 1, wherein the output control unit performs sorting, in a predetermined folder, the image data in which the error is detected, based on the information of the error or the invisible information.

Note 3

The image processing apparatus according to note 1 or 2, wherein the output control unit performs cancelling or suspending the output of the image data in which the error is detected, based on the information of the error or the invisible information.

Note 4

The image processing apparatus according to note 1 or 2, wherein the output control unit performs reporting to a user that the error is detected in the image data before outputting the image data in which the error is detected, based on the information of the error or the invisible information.

Note 5

The image processing apparatus according to note 1, wherein the output control unit performs correcting the error in the image data based on the information of the error or the invisible information, and the information adding unit performs adding, to the image data as the invisible information, correction information indicating that the error in the image data has been corrected.

Note 6

The image processing apparatus according to any one of notes 1 to 5, further including:

a reading unit for scanning an original document to generate the image data, wherein the detecting unit performs detecting of the error by using a processing result of an Optical Character Recognition/Reader (OCR) processing of recognizing the character in the image data and converting the recognized character into text data, and the output control unit performs controlling distribution of the image data or printing of the image data.

Note 7

The image processing apparatus according to any one of notes 1 to 5, further including:

a printing unit for printing the image data, wherein the detecting unit performs detecting of the error by using a spell check result of spell checking the image data, and the output control unit performs controlling the printing of the image data.

Note 8

The image processing apparatus according to any one of notes 1 to 7, wherein the information adding unit performs adding the information of the detected error as metadata of the image data, and the information of the error includes at least one of presence or absence of the error, a number of the errors, a range of the error, or a content of the error.

Note 9

9. An image processing method executed by a computer, the image processing method including:

a detecting process of detecting an error in a character, a word, or a sentence in image data;

an information adding process of adding, to the image data, information of the detected error when the error is detected, as invisible information that cannot be viewed or that is difficult to view in an image represented by the image data; and an output control process of controlling output of the image data by changing an output method of the image data in which the error is detected, based on a detection result of detecting the error or the invisible information.

Note 10

A program that causes a computer to execute:

a detecting process of detecting an error in a character, a word, or a sentence in image data;

an information adding process of adding, to the image data, information of the detected error when the error is detected, as invisible information that cannot be viewed or that is difficult to view in an image represented by the image data; and an output control process of controlling output of the image data by changing an output method of the image data in which the error is detected, based on a detection result of detecting the error or the invisible information.

According to an embodiment of the present invention, in an image processing apparatus for outputting image data, the output of image data in which an error is detected is prevented, and an error in the image data can be confirmed by a user.

The image processing apparatus, the image processing method, and the recording medium are not limited to the specific embodiments described in the detailed description, and variations and modifications may be made without departing from the spirit and scope of the present invention.

What is claimed is:

1. An image processing apparatus comprising:

circuitry; and a memory storing computer-executable instructions that cause the circuitry to execute:

detecting an error in a character, a word, or a sentence in image data;

adding, to the image data, information of the detected error when the error is detected, as invisible information that cannot be viewed or that is difficult to view in an image represented by the image data; and controlling output of the image data by changing an output method of the image data in which the error is detected, based on a detection result of detecting the error or the invisible information, wherein the information of the detected error added as the invisible information includes coordinate information indicating a position of the character, the word, or the sentence in which the error is found in the image represented by the image data.

2. The image processing apparatus according to claim 1, wherein the controlling includes sorting, in a predetermined folder, the image data in which the error is detected, based on the information of the error or the invisible information.

3. The image processing apparatus according to claim 1, wherein the controlling includes cancelling or suspending the output of the image data in which the error is detected, based on the information of the error or the invisible information.

4. The image processing apparatus according to claim 1, wherein the controlling includes reporting to a user that the error is detected in the image data before outputting the image data in which the error is detected, based on the information of the error or the invisible information.

5. The image processing apparatus according to claim 1, wherein the controlling includes correcting the error in the image data based on the information of the error or the invisible information, and the adding includes adding, to the image data as the invisible information, correction information indicating that the error in the image data has been corrected.

6. The image processing apparatus according to claim 1, wherein the circuitry is further caused to execute:

scanning an original document to generate the image data, wherein the detecting includes detecting the error by using a processing result of an Optical Character Recognition/Reader (OCR) processing of recognizing the character in the image data and converting the recognized character into text data, and the controlling includes controlling distribution of the image data or printing of the image data.

7. The image processing apparatus according to claim 1, wherein the circuitry is further caused to execute:

printing the image data, wherein the detecting includes detecting the error by using a spell check result of spell checking the image data, and the controlling includes controlling the printing of the image data.

8. The image processing apparatus according to claim 1, wherein the adding includes adding the information of the detected error as metadata of the image data, and the information of the error includes at least one of presence or absence of the error, a number of the errors, a range of the error, or a content of the error.

9. The image processing apparatus according to claim 1, wherein the adding includes adding the information of the detected error to the image data as a digital watermark.

10. An image processing method executed by an image processing apparatus, the image processing method comprising:

detecting an error in a character, a word, or a sentence in image data;

adding, to the image data, information of the detected error when the error is detected, as invisible information that cannot be viewed or that is difficult to view in an image represented by the image data; and controlling output of the image data by changing an output method of the image data in which the error is detected, based on a detection result of detecting the error or the invisible information, wherein the information of the detected error added as the invisible information includes coordinate information indicating a position of the character, the word, or the sentence in which the error is found in the image represented by the image data.

11. The image processing method according to claim 10, wherein the controlling includes sorting, in a predetermined folder, the image data in which the error is detected, based on the information of the error or the invisible information.

12. The image processing method according to claim 10, wherein the controlling includes cancelling or suspending the output of the image data in which the error is detected, based on the information of the error or the invisible information.

13. The image processing method according to claim 10, wherein the controlling includes reporting to a user that the error is detected in the image data before outputting the image data in which the error is detected, based on the information of the error or the invisible information.

14. The image processing method according to claim 10, wherein the controlling includes correcting the error in the image data based on the information of the error or the invisible information, and the adding includes adding, to the image data as the invisible information, correction information indicating that the error in the image data has been corrected.

15. A non-transitory computer-readable recording medium storing a program that causes a computer to execute a process, the process comprising:

detecting an error in a character, a word, or a sentence in image data;

adding, to the image data, information of the detected error when the error is detected, as invisible information that cannot be viewed or that is difficult to view in an image represented by the image data; and controlling output of the image data by changing an output method of the image data in which the error is detected, based on a detection result of detecting the error or the invisible information, wherein the information of the detected error added as the invisible information includes coordinate information indicating a position of the character, the word, or the sentence in which the error is found in the image represented by the image data.

* * * * *